United States Patent
Schroeder et al.

(10) Patent No.: US 9,225,227 B2
(45) Date of Patent: Dec. 29, 2015

(54) ELECTRIC MACHINE

(71) Applicant: Robert Bosch GmbH, Stuttgart (DE)

(72) Inventors: Bernd Schroeder, Esslingen (DE);
Christian Maus, Remseck A.N. (DE)

(73) Assignee: Robert Bosch GmbH, Stuttgart (DE)

( * ) Notice: Subject to any disclaimer, the term of this patent is extended or adjusted under 35 U.S.C. 154(b) by 150 days.

(21) Appl. No.: 13/757,984

(22) Filed: Feb. 4, 2013

(65) Prior Publication Data
US 2013/0200757 A1 Aug. 8, 2013

(30) Foreign Application Priority Data
Feb. 3, 2012 (DE) .................... 10 2012 201 644

(51) Int. Cl.
| | |
|---|---|
| H02K 13/00 | (2006.01) |
| H02K 11/00 | (2006.01) |
| H02K 29/08 | (2006.01) |
| H02K 13/02 | (2006.01) |
| H02K 3/52 | (2006.01) |

(52) U.S. Cl.
CPC .............. *H02K 13/003* (2013.01); *H02K 3/528* (2013.01); *H02K 11/0015* (2013.01); *H02K 11/0021* (2013.01); *H02K 13/02* (2013.01); *H02K 29/08* (2013.01)

(58) Field of Classification Search
USPC ............ 310/68 B, 89, 91, 128, 143, 147, 232
See application file for complete search history.

(56) References Cited

U.S. PATENT DOCUMENTS

| | | | | |
|---|---|---|---|---|
| 5,550,418 | A | * | 8/1996 | Chung ........................... 310/239 |
| 5,866,967 | A | * | 2/1999 | Sasaki ............................ 310/232 |
| 6,013,961 | A | * | 1/2000 | Sakamaki et al. ........... 310/68 B |
| 6,215,472 | B1 | * | 4/2001 | Chen .............................. 345/161 |
| 6,452,383 | B1 | | 9/2002 | Goedecke |
| 2007/0024131 | A1 | | 2/2007 | Rouleau et al. |
| 2007/0188034 | A1 | * | 8/2007 | Yoshida .......................... 310/90 |
| 2011/0210644 | A1 | * | 9/2011 | Krogh et al. .................. 310/232 |

FOREIGN PATENT DOCUMENTS

| | | |
|---|---|---|
| DE | 10258036 | 6/2004 |
| DE | 102004003803 | 8/2005 |

* cited by examiner

*Primary Examiner* — Naishadh Desai
(74) *Attorney, Agent, or Firm* — Michael Best & Friedrich LLP

(57) ABSTRACT

An electric machine (1), in particular for a drive apparatus for a motor vehicle, comprising a rotor shaft (9), which is mounted rotatably in a housing (2), comprising a slip ring device (13), which has at least two slip rings (14, 15) arranged in rotationally fixed fashion on the rotor shaft (9) and at least two sliding contacts (16, 17), which are arranged in the housing (2) and interact with in each case one of the slip rings (14, 15), and comprising a rotation angle detection device, which has at least one rotation angle encoder (23) arranged on the rotor shaft (9) and at least one rotation angle sensor (26) arranged in the housing for detecting the rotation angle encoder (23).

16 Claims, 5 Drawing Sheets

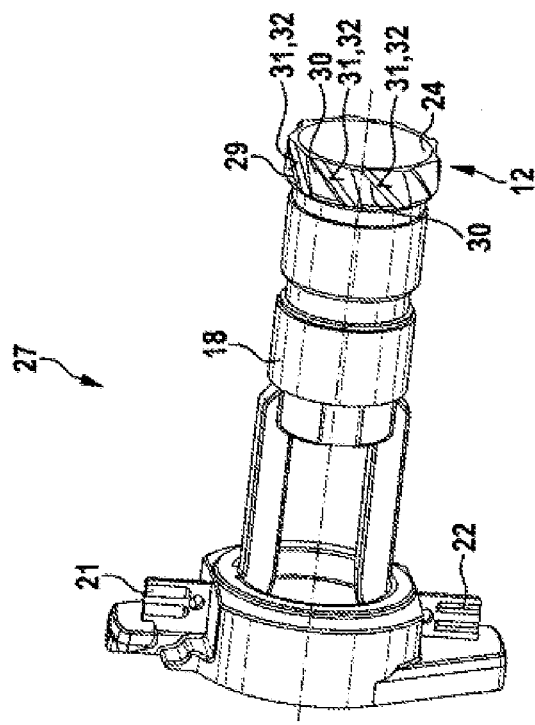
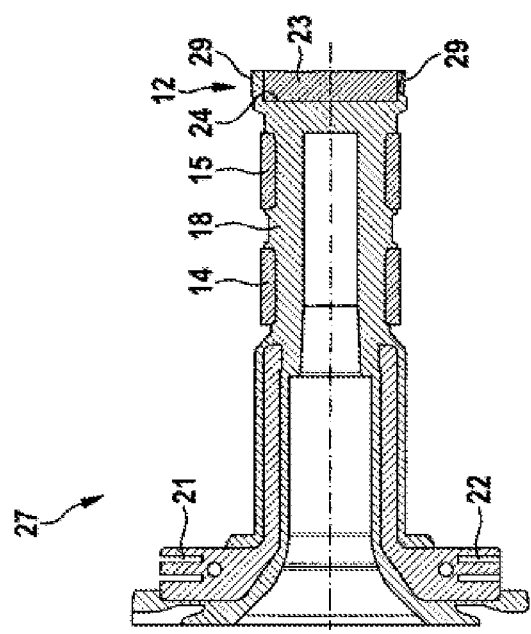
Fig. 4A
Fig. 4B

ELECTRIC MACHINE

BACKGROUND OF THE INVENTION

The invention relates to an electric machine, in particular for a drive apparatus for a motor vehicle, comprising a rotor shaft, which is mounted rotatably in a housing, comprising a sliding device, which has at least two slip rings arranged in rotationally fixed fashion on the rotor shaft and at least two sliding contacts, which are arranged in the housing and interact with in each case one of the slip rings, and comprising a rotation angle detection device, which has at least one rotation angle encoder arranged on the rotor shaft and at least one rotation angle sensor arranged in the housing for detecting the rotation angle encoder, Electric machines of the type mentioned at the outset are known from the prior art. In general, an electric machine has a rotor, which is mounted on a rotor shaft and which interacts with a stator arranged in a housing bearing the rotor shaft. In particular when the electric machine is intended to be operated as a motor, an electrical connection to a rotor winding of the rotor needs to be provided, but this electrical connection cannot be represented easily owing to the rotational movement of the rotor. It is known to provide a slip ring device which has at least two slip rings arranged in rotationally fixed fashion on the rotor shaft and at least two sliding contacts, for example sliding brushes, which are arranged fixedly in the housing and interact with in each case one of the slip rings. The sliding contacts are in touching contact with the respective slip ring and thus produce an electrical contact in any rotation angle position of the rotor. In order to be able to drive the electric machine correctly, a rotation angle detection device is also provided, which comprises a rotation angle encoder and a rotation angle sensor. The rotation angle encoder is arranged on the rotor shaft, with the result that the position of the rotation angle encoder correlates with the rotation angle position of the rotor shaft. The rotation angle sensor, on the other hand, is arranged on the housing and is aligned in such a way that it detects the rotation angle encoder in order to be able to detect or determine the position of the rotation angle encoder and therefore the rotation angle position of the rotor shaft.

SUMMARY OF THE INVENTION

The electric machine according to the invention has the advantage that, firstly, it can be installed easily and, secondly, few individual parts are required. To this extent, the electric machine according to the invention can be produced at less expense and more quickly than known machines. The machine according to the invention is characterized by the fact that a sleeve is provided which is applied to a free end of the rotor shaft and which bears the slip rings on its lateral outer wall and the rotation angle encoder on a free end side. An assembly comprising the slip rings, the rotation angle encoder and the sleeve is thus provided. This can preferably be preassembled as a preassembled group and then applied to the rotor shaft. Alternatively, the assembly is not preassembled or is only partly preassembled, for example, and is only finished on the rotor shaft. Since the slip rings together with the sleeve and the rotation angle encoder form one assembly, and in particular no further component parts are required for fastening the rotation angle encoder, fewer individual parts are used. The assembly time is reduced and the production costs are also reduced.

Provision is preferably made for the sleeve to have, at its free end side, a receiving depression, in which the rotation angle encoder is arranged. Advantageously, the rotation angle encoder is arranged completely in the receiving depression. As a result, it is located in a protected position. Furthermore, the arrangement in the receiving depression preferably ensures that the rotation angle encoder, when viewed radially, is held in a form-fitting manner in the receiving depression, with the result that high radial forces can act on the rotation angle encoder without said rotation angle encoder being released. It is naturally also conceivable for the rotation angle encoder to be provided such that it lies only regionally in the receiving depression.

In accordance with an advantageous development of the invention, provision is made for the rotation angle encoder to be pressed into the receiving depression so as to be locked in a force-fitting manner. The outer contour of the rotation angle encoder and the inner contour of the receiving depression are expediently formed correspondingly such that they form a press fit. Preferably, the receiving depression and/or the rotation angle encoder have insertion bevels, which facilitate the insertion and pressing-in. As a result of the force-fitting locking, easy and quick assembly of the rotation angle encoder on the sleeve and therefore on the rotor shaft is possible.

Preferably, the rotation angle encoder is additionally or alternatively held in the receiving depression by means of adhesive bonding and/or injection-molding. It is thus conceivable for an adhesive layer to be provided and for the rotation angle encoder to be arranged on this adhesive layer. As an alternative or in addition, the rotation angle encoder can be encapsulated by injection-molding, for example with plastics material, in particular regionally encapsulated by injection-molding, and can thus be locked in the receiving depression. Particularly preferably, the rotation angle encoder is encapsulated by injection-molding or injection-molded by the material of the sleeve during manufacture of the sleeve, which is preferably produced by means of an injection-molding process. The adhesive bonding or injection-molding serves to increase the strength of the locking of the rotation angle encoder.

In accordance with an advantageous development of the invention, provision is made for the free end side of the sleeve to be closed. Therefore, the sleeve has a cup shape, wherein the closed end is associated with the free end of the rotor shaft, onto which the sleeve is applied. As a result, a closed bearing face is provided for the rotation angle encoder, with said rotation angle encoder particularly advantageously being capable of being arranged and fastened on said bearing face.

Preferably, provision is made for the sleeve to be pushed, shrunk-fit or sprayed onto the free end of the rotor shaft for rotationally fixed fastening. The sleeve can be pushed onto the sleeve, for example together with the slip rings and the rotation angle encoder, as one unit or a preassembled group, in particular can be pressed onto said sleeve by the selection of corresponding diameters of rotor shaft and sleeve. Alternatively, it is conceivable for the sleeve to be shrunk-fit or sprayed directly onto the rotor shaft and for the slip rings and the rotation angle encoder to be provided subsequently or even during the spraying operation.

Particularly preferably, the sleeve has a fan impeller. The air flow produced thereby results in particular in cooling of the slip ring device and possibly also of the rotation angle encoder. Particular preferably, the fan impeller is designed in such a way that an air flow is produced in the direction of the rotor, wherein the housing preferably has corresponding openings, with the result that the air flow passes from the outside into the housing, is sucked in by the fan impeller and is driven in the direction of the rotor and through said rotor in order to emerge again out of the housing on the other side of the rotor. Preferably, the fan impeller is arranged at the level of the rotation angle encoder or the receiving depression on the sleeve.

In accordance with a preferred development of the invention, provision is made for the fan impeller to be formed by fan blades arranged on the sleeve. This avoids an additional fan impeller being pushed onto the sleeve. Instead, the fan blades of the fan impeller are arranged directly on the sleeve and fastened thereto in order to achieve an electric machine with a particularly compact design. Particularly preferably, the fan blades are formed integrally with the sleeve. For this purpose, in accordance with a particularly preferred embodiment, provision is made for the fan blades to be formed by faces provided on the lateral outer wall of the sleeve which extend at an angle, when viewed in the axial extent of the sleeve, and are aligned at least substantially radially or are at an angle to the lateral outer face. In other words, therefore, the sleeve has, in at least one axial section, a profile which forms fan blades in order to produce a corresponding air flow on rotation of the rotor shaft.

Particularly preferably, the rotation angle encoder is in the form of a permanent magnet with at least two poles. On rotation of the rotor shaft, the magnetic field of the permanent magnet therefore also rotates and can be detected in a simple manner by the correspondingly designed rotation angle sensor, which is designed to detect the magnetic field. Preferably, the permanent magnet is radially magnetized.

Expediently, the sleeve consists of a nonmagnetic and electrically nonconductive material in order not to impair precise detection of the rotation angle position of the magnetic rotation angle encoder and in order to avoid additional insulation elements for the slip rings.

Particularly preferably, the sleeve is manufactured from plastic. As a result, it can be provided with different shapes in a particularly simple manner. In particular, the above-described preassembled assembly comprising the sleeve, the slip rings and the rotation angle encoder can be produced in one step during spraying of the sleeve. In order to ensure an advantageous rotationally fixed arrangement of the sleeve on the rotor shaft, a form-fitting connection, a force-fitting connection and/or a cohesive connection can be provided, which connections act between the sleeve and the rotor shaft.

BRIEF DESCRIPTION OF THE DRAWINGS

The invention will be explained in more detail below with reference to the drawing, in which:

FIGS. 4A and 4B show the sleeve in accordance with a second exemplary embodiment in different illustrations.

DETAILED DESCRIPTION

Figure 1:
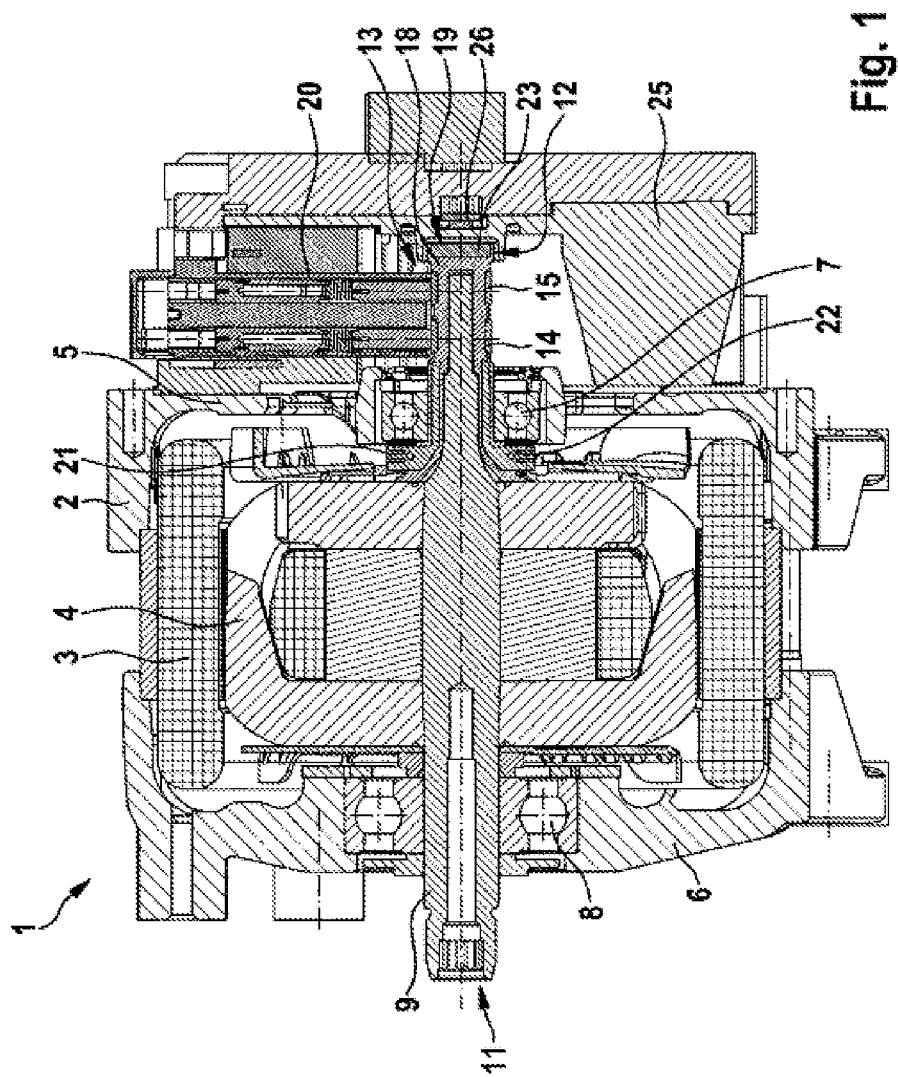
FIG. 1 shows an electric machine in a longitudinal sectional illustration.

FIG. 1 shows, in a simplified longitudinal sectional illustration, an electric machine 1, which can be used as a drive assembly in a motor vehicle. The electric machine 1 has a housing 2, in which a stator 3 and a rotor 4, which in this case is in the form of a claw-pole rotor, are arranged, with the stator mounted fixedly and the rotor mounted rotatably. The housing 2 has two mutually opposite end plates 5, 6 which each bear a rolling bearing 7, 8, which in this case is in the form of a ball bearing. The rolling bearings 7, 8 are used for the low-friction bearing arrangement of a rotor shaft 9, which bears the rotor 4 and which extends axially through the housing 2.

At one end, the rotor shaft 9 has a coupling element 11, which is used for connecting the rotor shaft 9 to a gear mechanism, for example, in rotationally fixed fashion. In this case, the coupling means 11 is in the form of internal toothing. A slip ring device 13 is associated with that end 10 of the rotor shaft 9 which is opposite the coupling element 11. In this case, the end 10 protrudes through the end plate 5, with the result that it is freely accessible on the other side of the end plate 5.

Figure 2:
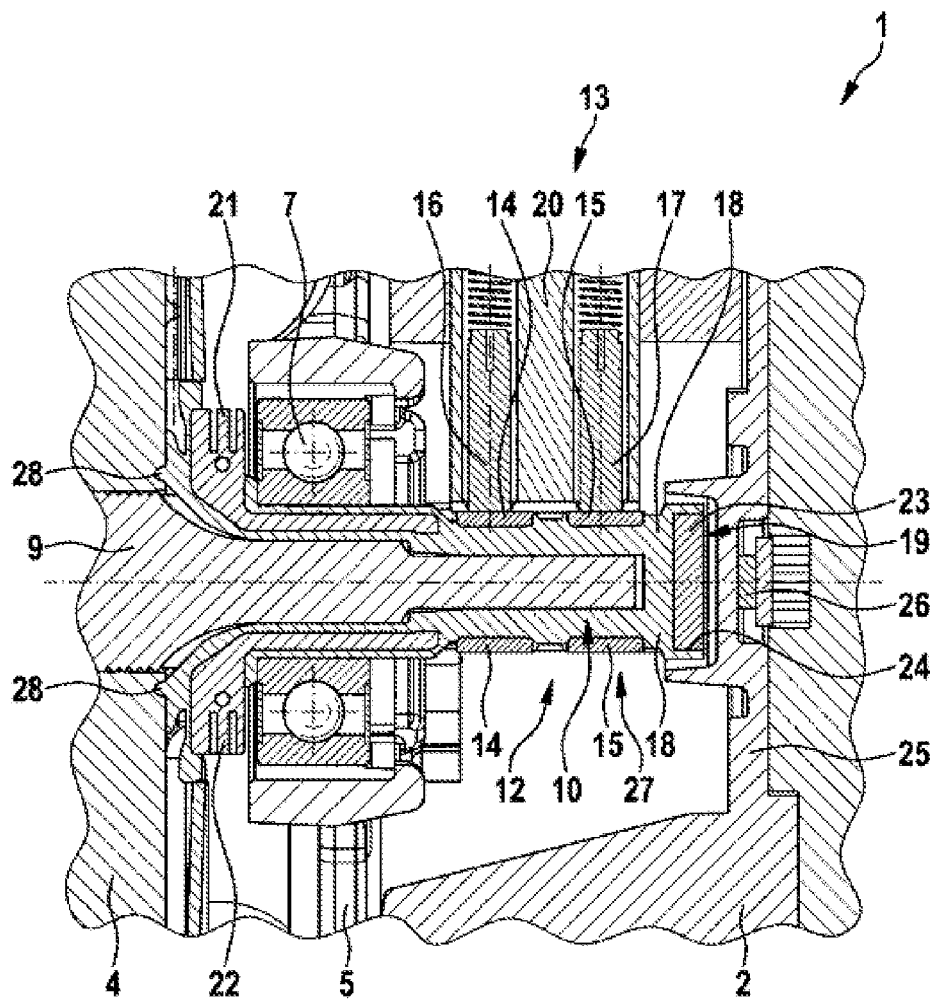
FIG. 2 shows an enlarged detail view of the electric machine.

The slip ring device 13, which is likewise illustrated in an enlarged detail view in FIG. 2, has two slip rings 14, 15 and two sliding brushes 16, 17 as sliding contacts, wherein in each case one sliding brush 16, 17 interacts with one of the slip rings 14 or 15. The slip rings 14, 15 are arranged coaxially with respect to the rotor shaft 9 or the rotation axis thereof on the end 10 of the rotor shaft 9. For this purpose, a sleeve 18 is pushed onto the end 10 of the rotor shaft 9, said sleeve having an approximately U-shaped longitudinal section and being closed at its free end side 19. The inner contour of the sleeve 18 substantially corresponds to the outer contour of the free end 10 of the rotor shaft 9. In this case, the cutout in the sleeve 15 which receives the end 10 is designed in such a way that a press fit is formed between the sleeve 18 and the rotor shaft 9, which press fit results in a secure and rotationally fixed fit of the sleeve 18 on the rotor shaft 9. The slip rings 14 and 15 are arranged spaced apart from one another on the lateral outer wall of the sleeve 18.

For this purpose, the sleeve 18 has two groove-like depressions in its lateral outer wall, which depressions each extend over the circumference and in which depressions in each case one of the slip rings 14, 15 rests.

The slip ring brushes 16, 17 are mounted movably in a brush holder 20 which is fixed on the housing side and in each case a spring force is applied to said slip ring brushes in the direction of the slip rings 14, 15 in order to ensure that the sliding brushes 16, 17 are always in bearing contact with the slip rings 14, 15. The slip rings 14, 15 are electrically connected to busbars 21, 22, which are held fixedly in or on the sleeve 18 and extend substantially in the direction of the rotor 4. The rotor-side ends of the busbars 21, 22 are freely accessible and are correspondingly operatively connected to the winding of the rotor, with the result that electrical energy can be supplied to the rotor winding via the sliding brushes 16, 17, the slip rings 14, 15 and the busbars 21, 22.

The sleeve 18 has a rotation angle encoder 23 on its free end side 19. The rotation angle encoder 23 is in this case in the form of a permanent magnet, as illustrated by way of example in FIG. 5, and rests in a receiving depression 24 in the free end side 19 of the sleeve 18. The receiving depression 24 is in the form of an axial depression. That end side of the rotation angle encoder 23 which points away from the rotor shaft 9 is exposed, with the result that the magnetic field of the rotation angle encoder 23 can unfold freely at least in the direction away from the rotor shaft 9. The rotation angle encoder 23 is in this case connected to the sleeve 18 in rotationally fixed fashion.

Figure 5:
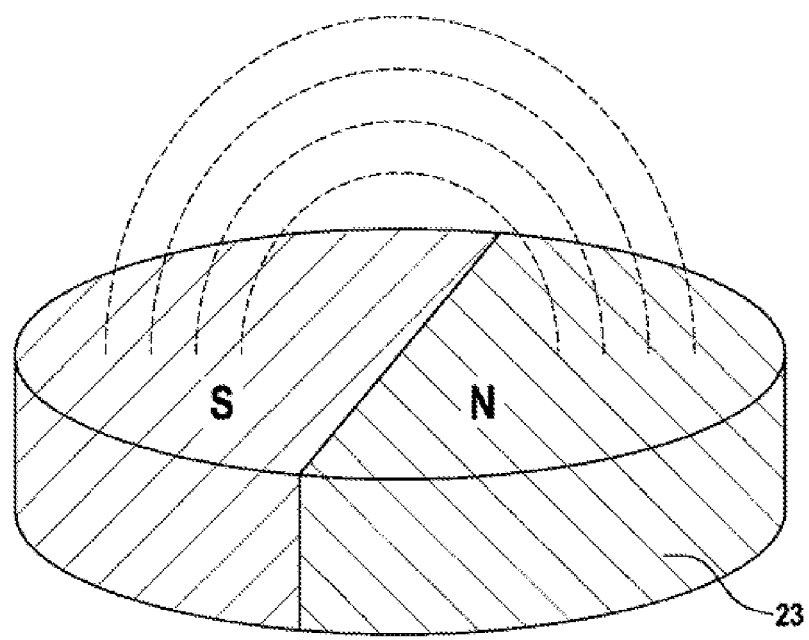
FIG. 5 shows a rotation angle encoder of the electric machine.

A rotation angle sensor 26 is arranged opposite the rotation angle encoder 23 on a housing wall 25 of the housing 2 which is opposite the rotation angle encoder 23 in order to detect the magnetic field produced by the rotation angle encoder 23, as is illustrated by way of example in FIG. 5. The rotation angle encoder and the rotation angle sensor 26 to this extent form a rotation angle detection device.

By virtue of the integration of the rotation angle encoder 23 in the sleeve 18 of the slip ring device 13, an electric machine is provided which has a particularly compact design and is particularly inexpensive. The fixing of the rotation angle encoder 23 in the receiving depression 24 can be performed by means of a force-fitting connection, in which the rotation angle encoder 23 is pressed into the receiving depression, or else by adhesive bonding. Advantageously, the rotation angle encoder 23 is integrated during manufacture of the sleeve 18 by virtue of the fact that the rotation angle encoder 23 is encapsulated by injection-molding regionally by the material of the sleeve 18, as illustrated. The same applies to the slip rings 14 and 15.

Then, the sleeve 18 can be pushed, for example, together with the rotation angle encoder 23 and the slip rings 14, 15 and possibly with the busbars 21, 22 as a preassembled assembly 27 onto the free end 10 of the rotor shaft 9. Alternatively, it is conceivable for the sleeve 18 to be sprayed onto the end 10 of the rotor shaft 9 and for the rotation angle encoder 23, the slip rings 14, 15 and/or the busbars 21, 22 to be added retrospectively or to also be integrated directly during the encapsulation by injection-molding process. In any case, the rotation angle encoder 23 and the slip rings 14, 15 and the busbars 21, 22 are ultimately embedded in the sleeve 18 or in the plastic injection-molded encapsulation forming the sleeve 18. By virtue of the arrangement of the rotation angle encoder 23 in the receiving depression 24, said rotation angle encoder is arranged so as to be substantially protected against contamination and other external influences.

Figure 3A:
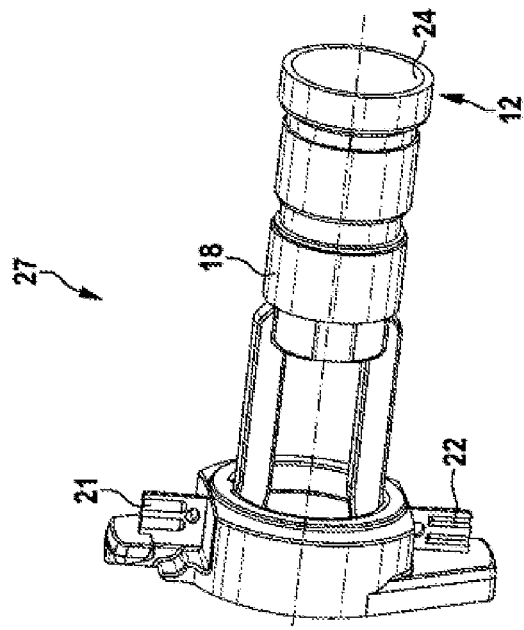
FIGS. 3A and 3B show a first exemplary embodiment of a sleeve of a slip ring device in different illustrations.
Figure 3B:
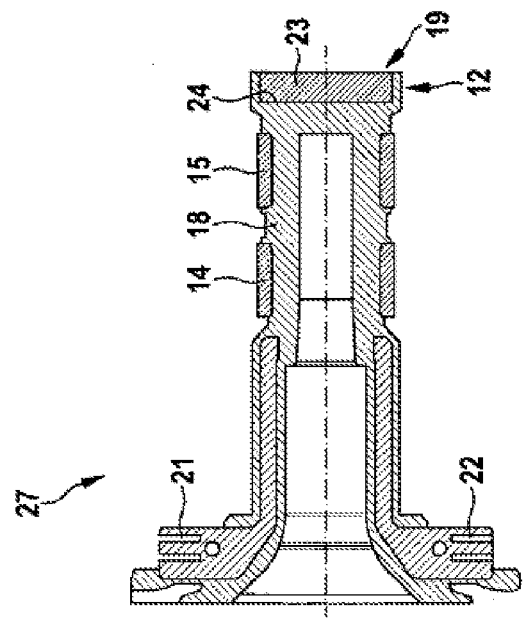

FIGS. 3A and 3B show a first exemplary embodiment of the preassembled assembly 27 already mentioned above. FIG. 3A shows, in this regard, the preassembled group 27 in a longitudinal sectional illustration, wherein the preassembled assembly 27 illustrated here corresponds to the assembly shown already in FIGS. 1 and 2. FIG. 3B shows the preassembled assembly 27 in a perspective illustration without the slip rings 14, 15 and without the rotation angle encoder 23. Advantageously, the maximum outer diameter of the sleeve 18 is smaller than the inner diameter of the rolling bearing 7, with the result that the preassembled assembly 27 can be pushed through the rolling bearing 7. At its rotor-side end, the sleeve 18 also preferably has rotation driver means 28, which ensure a rotationally fixed connection to the rotor 4 in a form-fitting manner. As can be seen in FIG. 2, the rotation driver means 28 are preferably projections on the sleeve 18 which engage in receptacles in the rotor 4.

FIGS. 4A and 4B show an advantageous development of the sleeve 18 and of the preassembled assembly 27, respectively, to the extent that the sleeve 18 has a fan impeller 29 at its end 12 associated with the end side 19 in the region of the receiving depression 24, said fan impeller preferably being formed integrally with the sleeve 18. For this purpose, a plurality of elevations 30, which are in particular arranged distributed uniformly over the circumference, are provided on the lateral outer wall of the sleeve 18 at the end 12, only some of said elevations being provided with reference symbols here for reasons of clarity, and which each form a face 31, which runs at an angle, when viewed in the axial extent of the sleeve 18, and which protrudes at an angle or perpendicularly from the lateral outer wall (radially). These faces 31 form fan blades 32 of the fan impeller 29. By virtue of the integral formation, an additional ventilation function is integrated in the preassembled assembly 27, in particular the sleeve 18, in a simple and compact manner, which ventilation function in particular produces an air flow serving to cool the slip ring device 13 during operation. At the same time, the rotation angle encoder 23 can also be cooled thereby. It is also conceivable for the air flow to be conducted further through the rotor 4 and the stator 3 by virtue of providing corresponding openings in the end plate 5. Expediently, the outer diameter of the fan impeller 29 is selected to be smaller than the inner diameter of the rolling bearing 7 in order to enable simple assembly and disassembly. Alternatively or in addition, a correspondingly designed fan impeller 29 can also be provided at another point on the sleeve 18, i.e. in another axial position along the sleeve 18, such as between the slip rings 14 and 15 or in the region of the busbars 21, 22, for example.

What is claimed is:

1. An electric machine (1), comprising a rotor shaft (9), which is mounted rotatably in a housing (2), a slip ring device (13), which has at least two slip rings (14, 15) arranged in rotationally fixed fashion on the rotor shaft (9) and at least two sliding contacts (16, 17), which are arranged in the housing (2) and interact with in each case one of the slip rings (14, 15), and a rotation angle detection device, which has at least one rotation angle encoder (23) arranged on the rotor shaft (9) and at least one rotation angle sensor (26) arranged in the housing for detecting the rotation angle encoder (23), characterized by a sleeve (18), which is applied to a free end (10) of the rotor shaft (9) and bears the slip rings (14, 15) on a lateral outer wall of the sleeve and the rotation angle encoder (23) on one free end side (19) of the sleeve.

2. The electric machine according to claim 1, characterized in that the sleeve (18) has, at the free end side (19), a receiving depression (24), in which the rotation angle encoder (23) is arranged.

3. The electric machine according to claim 2, characterized in that the rotation angle encoder (23) is pressed into the receiving depression (24) so as to be locked in a force-fitting manner.

4. The electric machine according to claim 2, characterized in that the rotation angle encoder (23) is held in the receiving depression (24) by at least one of adhesive bonding and injection-molding.

5. The electric machine according to claim 1, characterized in that the free end side (19) of the sleeve (18) is closed.

6. The electric machine according to claim 1, characterized in that the sleeve (18) is pushed, pressed, shrunk-fit or sprayed onto the free end (10) of the rotor shaft (9) for fastening in rotationally fixed fashion.

7. The electric machine according to claim 1, characterized in that the sleeve (18) has a fan impeller (29).

8. The electric machine according to claim 7, characterized in that the fan impeller (29) is formed by fan blades (31), which are arranged on the sleeve (18).

9. The electric machine according to claim 1, characterized in that the rotation angle encoder (23) is in the form of a permanent magnet with at least two poles.

10. The electric machine according to claim 1, characterized in that the sleeve (18) is plastic.

11. The electric machine according to claim 1, characterized in that a fan impeller (29) is formed by fan blades (31), which are formed integrally with the sleeve (18).

12. The electric machine according to claim 5, characterized in that the sleeve (18) surrounds the shaft (9).

13. The electric machine according to claim 1, characterized in that the free end side (19) of the sleeve (18) is closed in the axial direction.

14. The electric machine according to claim 13, characterized in that the sleeve (18) has, at the free end side (19), an axial receiving depression (24), in which the rotation angle encoder (23) is arranged.

15. The electric machine according to claim 2, characterized in that the depression (24) is in the form of an axial depression.

16. The electric machine according to claim 8, characterized in that the fan blades (31) are disposed radially to an axial depression (24) at the free end side (19) of the sleeve (18).

* * * * *